July 4, 1961  F. G. BELLEK  2,991,327
JUNCTION BOX
Filed Oct. 8, 1958
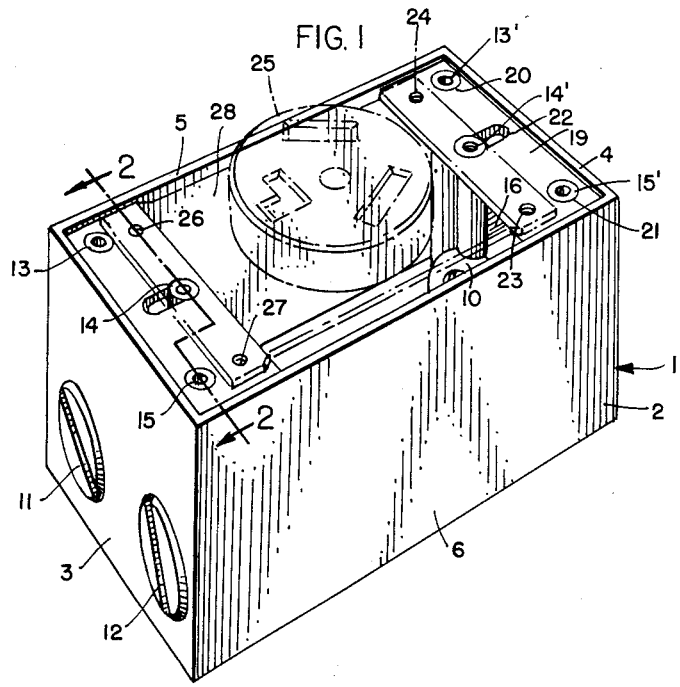
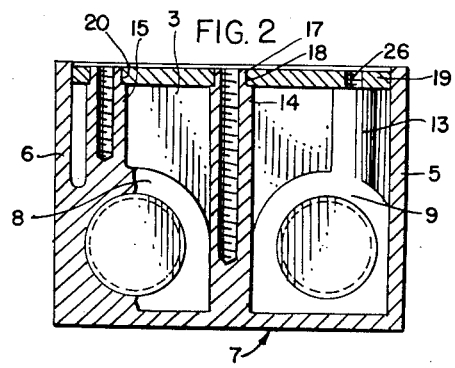
INVENTOR:
FRANK G. BELLEK
BY
ATT'Y

United States Patent Office 2,991,327
Patented July 4, 1961

2,991,327
JUNCTION BOX
Frank G. Bellek, Chicago, Ill., assignor to Bell Electric Company, Chicago, Ill., a corporation of Illinois
Filed Oct. 8, 1958, Ser. No. 766,101
6 Claims. (Cl. 174—53)

This invention relates in general to certain new and useful improvements in electrical junction boxes and more specifically to such a box having features rendering it more adaptable to universal use with various types of electrical fixture inserts.

The primary object of this invention is to provide a die cast junction box of greater utility than those of the prior art.

A more specific object of this invention is to provide a die cast junction box of a single type having attached thereto mounting plates adaptable to receive and support electrical fixtures of varied types.

Another object of this invention is to provide a die cast junction box having secured thereto, by a novel attachment, mounting plates adaptable to receive and support electrical fixtures of varied types.

With the foregoing and other objects in mind, the invention resides in the following specification and appended claims, certain embodiments and details of construction of which are illustrated in the accompanying drawings in which:

FIG. 1 is a view in perspective of the junction box comprising the invention with an electrical fixture insert being illustrated in phantom lines, and FIG. 2 is a sectioned view of the junction box taken along the lines 2—2 of FIG. 1.

Referring now in more detail by reference characters to the drawings a junction box 1 is illustrated as comprising a unitary cast open-topped shell-like housing 2 including end walls 3 and 4, side walls 5 and 6 and a bottom wall 7. The housing 2 is preferably formed of light weight rugged material such as an aluminum alloy by a die casting process. Also formed integrally with and projecting inwardly of the end wall 3 are longitudinally aligned bosses 8 and 9. A similar boss 10 projects inwardly from the opposite end wall 4. The bosses 8, 9 and 10 are internally tapped to receive conduit pipes (not shown) which carry the necessary wiring to be interconnected with a fixture in the box 1. Additional bosses to receive other conduit pipe may be provided in the bottom wall 7 or side walls 5 and 6 as required for a particular installation. The various bosses of the housing are closed to the exterior by threaded plugs such as 11 and 12 in wall 3 unless they are being utilized for a conduit connection.

The housing 2 is further provided with a plurality of integral pillars 13, 14 and 15 which are symmetrically arranged adjacent to end wall 3. Pillars 13 and 15 extend upwardly from their integral connection with bosses 9 and 8 respectively to a height flush with the upper edges of the walls of housing 2. The pillar 14 extends upwardly from the bottom wall 7 to the same height as pillars 13 and 15 and is provided with a reinforcing rib similar to rib 16 along its longitudinal dimension which is cast integral with the end wall 3.

Adjacent end wall 4 of housing 2 are similar pillars 13', 14' and 15'. In this case however the pillar 14' is formed integrally with, and extends upwardly from the centrally arranged boss 10. The pillar 14' is reinforced along its length by an integral rib 16 extending between the pillar and the end wall 4. The pillars 13' and 15' are integral with bottom wall 7 and extend upwardly therefrom in an identical manner to pillar 14.

All of the pillars are formed with a reduced diameter upper end portion 17 providing thereby a shoulder 18 for a purpose to be described. Furthermore each pillar is tapped longitudinally from its upper end as illustrated to provide thereby means to secure elements to the housing 2.

In order to render the box 1 adaptable to receiving electrical fixtures of various types and dimensions a mounting plate 19 is provided at each end of the housing 2. The mounting plates 19 are duplicates of each other, thus requiring but a single part to obtain the desired result. This is made possible by the duplicate symmetrical arrangement of the pillars within housing 2. Each plate 19 is provided with two holes 20 and 21 and a slot 22 utilized for assembly purposes on the pillars and also as clearance for shanks of screws employed to hold additional elements on the elements secured to the box. The plate 19 is provided further with tapped holes 23 and 24 which are positioned to accommodate mounting screws for specific fixture inserts.

When the electrician is making an installation utilizing the box 1 of this invention for the purpose of installing a fixture such as the socket 25, illustrated in phantom lines, plate 19 having the correct mounting holes 23 and 24 for the fixture are chosen for installation in housing 2. Each plate is dropped down over the pillar 14 or 14' with the slot 22 permitting relative movement between the plate and pillar so that the holes 20 and 21 may be more easily aligned with pillars 13 and 15. With plate 19 properly aligned relative to the pillars it will drop down on to the shoulder 18 of each pillar to be supported thereon with the plate's upper surface flush with the upper edges of housing 2. At this point the material of the plate is peened inwardly against the pillars to secure the plate in position. The fixture 25 may then be connected with the wiring (not shown) in box 1 and placed in position within the cavity of housing 2. Mating threaded holes 26 and 27 of fixture plate 28 align with similar holes 23 and 24 of plate 19 to make possible a simple rigid screw connection between fixture 25 and box 1.

A suitable cover (not shown) having an access opening to suit a particular fixture 25 may then be secured to box 1 by screws engaging the tapped portions of the pillars.

Thus it is apparent that the invention provides a junction box of wide utility while necessitating only two basic parts namely the housing 2 and the plate 19. The cover of course would be a third part but is not considered a basic part to the actual support of an electrical fixture within the confines of housing 2. It is realized that various design structural modifications of the construction illustrated might be devised by one skilled in the art, which would be considered well within the purview of this inventor and which should be considered as being within the scope of the appended claims.

What is claimed is:

1. An electrical junction box comprising a cast housing including bottom, end and side walls to define a cavity for the receipt of an electrical fixture, certain of said housing walls being provided with tapped bosses to receive mating pipe conduits, said housing being provided further with a plurality of integral upstanding pillars adjacent each end wall, each of said pillars having a reduced diameter upper end portion to thereby define a shoulder, and fixture mounting plates having apertures therein corresponding in position to the position of said pillars and being of approximately the diameter of the upper reduced diameter portions of the pillars whereby each plate is supported on the shoulders of said pillars, and means for securing said mounting plates in their supported position on said shoulders.

2. The invention according to claim 1 wherein the pillars are symmetrically arranged in an identical manner within either end of the housing so that but a single fixture mounting plate design is required for either end of the box.

3. The invention according to claim 1 wherein the pillars are axially tapped at their upper ends to provide means of securing a cover to the housing.

4. The invention according to claim 1 wherein the fixture mounting plates are tapped at plural points agreeing in position with similar tapped holes in the fixture which the plate is adapted to support.

5. An electrical junction box comprising a cast metal housing including bottom, end and side walls to define a cavity for the receipt of an electrical fixture, certain of said housing walls being provided with tapped bosses to receive mating pipe conduits, said housing being provided further with a plurality of integral upstanding pillars adjacent each end wall, each of said pillars having an upper end portion of reduced dimension to thereby define an outwardly facing shoulder, and metal mounting plates having apertures therein corresponding in position to the position of said pillars and having a dimension approximately the dimension of the reduced upper end portions of the pillars whereby each plate is supported on the shoulders of said pillars approximately flush with upper edges of the end and side walls, and means securing the reduced upper end portions and the mounting plates in mutually supported relationship.

6. The invention according to claim 5 wherein said securing means includes metal of one peened against metal of the other as between said reduced upper end portions and said mounting plates to form a unitary assembly of said housing and mounting plates.

References Cited in the file of this patent

UNITED STATES PATENTS

| | | |
|---|---|---|
| 681,416 | Goehst | Aug. 27, 1901 |
| 904,458 | Scism | Nov. 17, 1908 |

FOREIGN PATENTS

| | | |
|---|---|---|
| 106,601 | Australia | Feb. 9, 1939 |
| 604,429 | France | Jan. 26, 1926 |
| 645,142 | France | June 26, 1928 |